J. F. MANTEY.
Bushings for Beer and other Faucets.

No. 157,618. Patented Dec. 8, 1874.

Witnesses:
Jas. E. Hutchinson
J. W. Hister

Inventor:
John F. Mantey
Edson Bros.
Attorneys.

UNITED STATES PATENT OFFICE.

JOHN F. MANTEY, OF NEW ORLEANS, LOUISIANA.

IMPROVEMENT IN BUSHINGS FOR BEER AND OTHER FAUCETS.

Specification forming part of Letters Patent No. 157,618, dated December 8, 1874; application filed July 27, 1874.

*To all whom it may concern:*

Be it known that I, JOHN F. MANTEY, of New Orleans, in the parish of Orleans and State of Louisiana, have invented a certain new and useful Improvement in Bushings for Beer and other Faucets, of which the following is a full, clear, and exact description, reference being had to the annexed drawing, in which—

Figure 1:
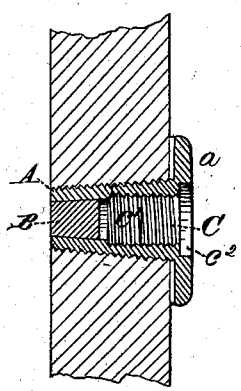
Figure 1:
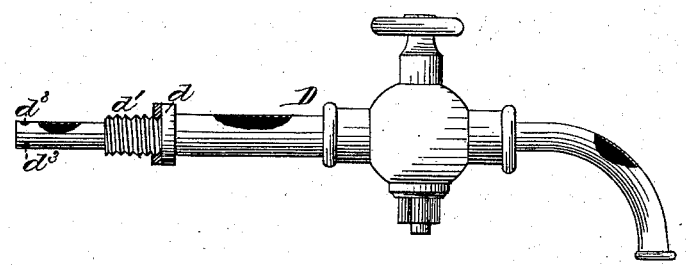
Figure 2:
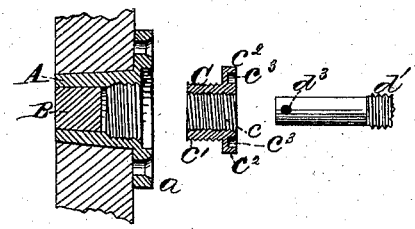

Figure 1 is a sectional view of my bushing, represented as screwed into a barrel-head, which is broken away, and a side view of a beer-faucet adapted for use in connection with my bushing; and Fig. 2 is also sectional views of my bushing, and a side view of a portion of the faucet.

Corresponding parts in the two figures are designated by like letters.

This invention relates to a certain improvement in bushings for beer and other faucets; and it consists of a bushing or thimble fitted with a plug or cork, and a tubular nut with an internal and external screw-thread, substantially as hereinafter more fully set forth.

In the annexed drawing, A refers to a thimble or bushing, which may be provided with an external screw-thread or apertures made in its flange $a$, through which screws may be inserted to attach it to the barrel previously provided with an orifice or hole for its reception. B is a plug or cork fitted in the thimble A to close its inner end, to prevent the escape of the liquid from the barrel or cask while being filled or shipped, &c. C is a tubular nut or second thimble, with an internal and external screw-thread, $c\ c^1$, the latter permitting it to be attached to the internally-threaded portion of the thimble or bushing A, as seen in Fig. 1, which acts to keep the plug or cork B from being forced from its seat by the liquid. Its internal screw-thread affords a means of attachment for the threaded portion of the faucet. The outer end of the nut or thimble C is provided with a flange, $c^2$, which is let into a countersink in the flange $a$ of the thimble A, flush with the outer surface of the said flange, and provided with cavities or recesses $c^3\ c^3$. D is a faucet, which has a collar, $d$, extending from which toward its inner end a short distance is a screw-thread, $d^1$, by which it is attached to the bushing. The unthreaded portion of the faucet from $d$ to its inner end is sufficiently long to force the plug or cork B out of the thimble or bushing A as it is being screwed to the latter, which will allow the contents of the barrel or cask to be drawn off. A washer of leather or other suitable material may be inserted on the faucet from its inner end against the collar $d$, to press against the flange $c^2$ of the nut C when the faucet and bushing are united. The extremity of the portion $d$ of the faucet is provided with lateral openings $d^3\ d^3$, to permit of the passage of the liquid to the faucet should the plug B remain over the inner end of the bushing.

It will be observed that as a consequence of the outer surface of the flange $c$ of the nut C being in a line and flush with that of the flange $a$ of the bushing or thimble A, countersunk, as shown, for that purpose, the requisite amount of flat and even surface will be furnished upon which to properly affix the tax-stamp, it being required by law to affix it at this point, to insure its cancellation at the time of tapping the barrel.

I am aware that a tube inserted into and extending beyond the thimble or nut to receive a valve, &c., is not new.

Having thus described my invention, what I claim, and desire to secure by Letters Patent, is—

The combination, with the bushing or thimble A, having the countersunk and perforated flange $a$, of the internally and externally threaded tubular nut C $c^2$, fitting in the said thimble or bushing, so as to form an annular shoulder to act as a stop to the plug or cork B inserted in the said bushing, substantially as shown and described.

In testimony whereof I have hereunto signed my name in presence of two subscribing witnesses.

JOHN F. MANTEY.

Witnesses:
GUSTAVUS C. TIMPE,
CINTIO ALEXIUS.